(12) United States Patent
Schmidt et al.

(10) Patent No.: US 7,246,786 B1
(45) Date of Patent: Jul. 24, 2007

(54) HEAVY DUTY PINCH VALVE

(75) Inventors: Harold D. Schmidt, Hopkinton, MA (US); Harry W. Jahnke, Bridgewater, MA (US)

(73) Assignee: Custom Valves, LLC, Milford, MA (US)

( * ) Notice: Subject to any disclaimer, the term of this patent is extended or adjusted under 35 U.S.C. 154(b) by 0 days.

(21) Appl. No.: 11/267,658

(22) Filed: Nov. 4, 2005

(51) Int. Cl.
*F16K 7/04* (2006.01)
(52) U.S. Cl. .......................................... 251/6; 137/347
(58) Field of Classification Search ................... 251/6, 251/4; 137/347, 348, 350
See application file for complete search history.

(56) References Cited

U.S. PATENT DOCUMENTS

| | | | | |
|---|---|---|---|---|
| 2,681,751 A | * | 6/1954 | Weber et al. .................. | 251/6 |
| 2,721,052 A | * | 10/1955 | Hull .............................. | 251/6 |
| 3,627,383 A | * | 12/1971 | Adler ............................ | 251/8 |
| 3,734,133 A | * | 5/1973 | Little et al. .................... | 251/6 |
| 3,823,724 A | * | 7/1974 | Davis ............................ | 251/5 |
| 4,125,125 A | * | 11/1978 | Ezekoye et al. ............... | 251/5 |
| 4,220,097 A | * | 9/1980 | Wempe et al. ............... | 251/144 |
| 4,527,489 A | * | 7/1985 | Schlink ....................... | 251/144 |
| 4,682,755 A | * | 7/1987 | Bernstein et al. .............. | 251/4 |
| 5,105,992 A | * | 4/1992 | Fender et al. .................. | 251/7 |
| 5,141,013 A | * | 8/1992 | Zink et al. ................... | 137/382 |
| 5,462,251 A | * | 10/1995 | Kawabe ........................ | 251/4 |
| 5,535,983 A | * | 7/1996 | Hohermuth ................... | 251/5 |
| 6,478,542 B1 | * | 11/2002 | Elliott ......................... | 416/61 |
| 6,536,739 B1 | * | 3/2003 | Jensen ........................... | 251/6 |
| 6,908,068 B2 | * | 6/2005 | Fortino et al. .............. | 251/292 |
| 6,957,798 B1 | * | 10/2005 | Schmidt ........................ | 251/6 |

* cited by examiner

*Primary Examiner*—John Bastianelli
(74) *Attorney, Agent, or Firm*—William A. Loginov; Hinckley, Allen & Snyder LLP (57) ABSTRACT

This invention provides a heavy duty pinch valve for use in industrial applications, such as railroad tank cars that is constructed with a sealed housing that is sufficiently sturdy to operate in tough environments and large material flows. The valve includes a welded one-piece framework for sturdy support of pinch elements and the spool. The framework includes a tank car-connecting flange with two pairs of upright supports welded thereto. One pair of supports includes apertures for rotatably supporting two intermeshed geared ends of the pinch elements that counter-rotate toward each other during closure. Between the geared ends extends a pinch element bearing shaft that is surrounded by a rotatable cylindrical sleeve adapted to bear against the spool. The geared ends are covered by side cover plates. A bottom cover plate having an outlet is provided. It is adapted to shear off the framework in the event of an accident.

15 Claims, 8 Drawing Sheets

HEAVY DUTY PINCH VALVE

BACKGROUND OF THE INVENTION

1. Field of the Invention

This invention relates to valves and more particularly to pinch valves.

2. Background Information

Large mechanical ball and butterfly valves are presently used on railroad tank cars to gate the flow of multi-phase fluids, such as calcium carbonate (limestone) slurry (a common ingredient in many chalky foods and medicines). Since tank cars are invariably exposed to outside temperatures below freezing, it is not uncommon for the slurry to freeze solid in the valve head. This may prevent the valve from opening. Even when opened, the plug of frozen material may be too adhered to clear the valve outlet. In the prior art, special heating jackets are often applied to mechanical valves to melt the slurry around the valve. However, this approach requires valves to be connected to a steam source during unloading of contents, increasing the time, cost and complexity of delivering contents. A valve type that avoids the shortcomings of mechanical ball and butterfly (gated) valves when handling frozen mixtures is highly desirable.

One form of valve that avoids mechanical gates and their disadvantages is the pinch valve. Pinch valves are used desirably for controlling flow of fluids and fluid/solid mixtures in a variety of processes and environments. In general, a pinch valve is a mechanism that provides a variable-diameter pinching force to a flexible or elastomeric tube/hose, which is often termed a "spool." By pinching, or constricting the spool, the amount of flow therethrough is varied between full, unrestricted flow and shutoff, completely restricted flow. One advantage of pinch valves is that the actuating mechanism is located outside of the tube interior lumen. The fluid never confronts any gates, flaps or other jointed/seamed parts. Rather, the fluid only confronts the pinched (but otherwise unbroken) inner wall of the spool. This greatly reduces the chances of undesirable accretion of particulates in multiphase or colloidal mixtures. In addition, this arrangement allows for isolation of the fluid from any materials that are not suitable for contact with the fluid. For example, many medical and food products can only come into contact stainless steel and food-grade polymers/elastomers. In a conventional, gated valve with crevices, seams or discontinuities invariably lead to contact with non-approved materials as well as the build-up of compounds within the valve mechanism.

However, pinch valves are typically designed for controlling flow in small-diameter tubes and hoses. Their construction tends to dictate a multi-piece, or split, framework that can be disassembled and exposed to allow replacement of the spool and/or assembly and disassembly of the pinch elements and associated gearing. This multi-piece framework is somewhat weak and typically unsealed. Such a design renders the typical pinch valve design unsuitable for heavy industrial applications, like railroad tank cars. Larger pinch valves often employ a screw-driven pinch element that operates on only one side of the spool, thereby causing the spool to spread unevenly during pinching, and compromising durability. Moreover, applicable standards, such as M-1002 Specifications for Tank Cars, promulgated by the American Association of Railroads (AAR), set forth the requirements for strength and survivability in the event of derailment. Conventional pinch valves do not contemplate such standards. For example, skid plates and other structures limit the possible vertical height of a bottom mounted tank car valve. Pinch valves, which often employ external gearing, may require too tall of a frame to provide needed clearance.

SUMMARY OF THE INVENTION

This invention overcomes the disadvantages of the prior art by providing a heavy duty pinch valve for use in industrial applications, such as railroad tank cars that is constructed with a sealed housing that is sufficiently sturdy to operate in tough environments and large material flows. Because the valve's wetted surfaces contain no internal mechanicals (e.g. no moving balls, butterflies, gates, etc.), even frozen contents exit the valve easily. The valve includes a connector, mounted on a bottom shear plate designed to break away without causing the valve to open or rupture.

The valve according to an illustrative embodiment includes a welded framework for sturdy support of pinch elements and the spool. The framework includes a tank car-connecting flange with two pairs of upright supports welded thereto. One pair of supports includes apertures for rotatably supporting two intermeshed geared ends of the pinch elements that counter-rotate to close equally on the spool. Between the geared ends extends a pinch element bearing shaft that is surrounded by a rotatable cylindrical sleeve adapted to bear against the spool and further ease the resistance to closure. The spool is secured to the car-connecting flange by a pair of split rings that reside between the flange and a first sealing bead of the spool. A connecting fixture (typically of stainless steel) sits over the rings and lip to sealably secure the spool at the car-connecting flange end. The opposing end of the flange is secured by a pair of closure plate halves, each having a semicircular well that engages a second sealing bead of the spool, opposite the first sealing bead. The closure plate halves sit atop the apertured supports to secure the outlet end of the spool. The closure plate halves are, themselves, covered with a gasketed outlet plate that is bolted onto the framework (over both pairs of supports) and capable of shearing off the framework in the event of an impact, leaving the underlying closure plate halves and spool intact, and the valve closed. The apertured supports are sealed by gasketed side covers that are bolted thereover, and that enclose the geared ends of the pinch elements.

BRIEF DESCRIPTION OF THE DRAWINGS

The invention description below refers to the accompanying drawings, of which.

DETAILED DESCRIPTION OF AN ILLUSTRATIVE EMBODIMENT

Figure 1:
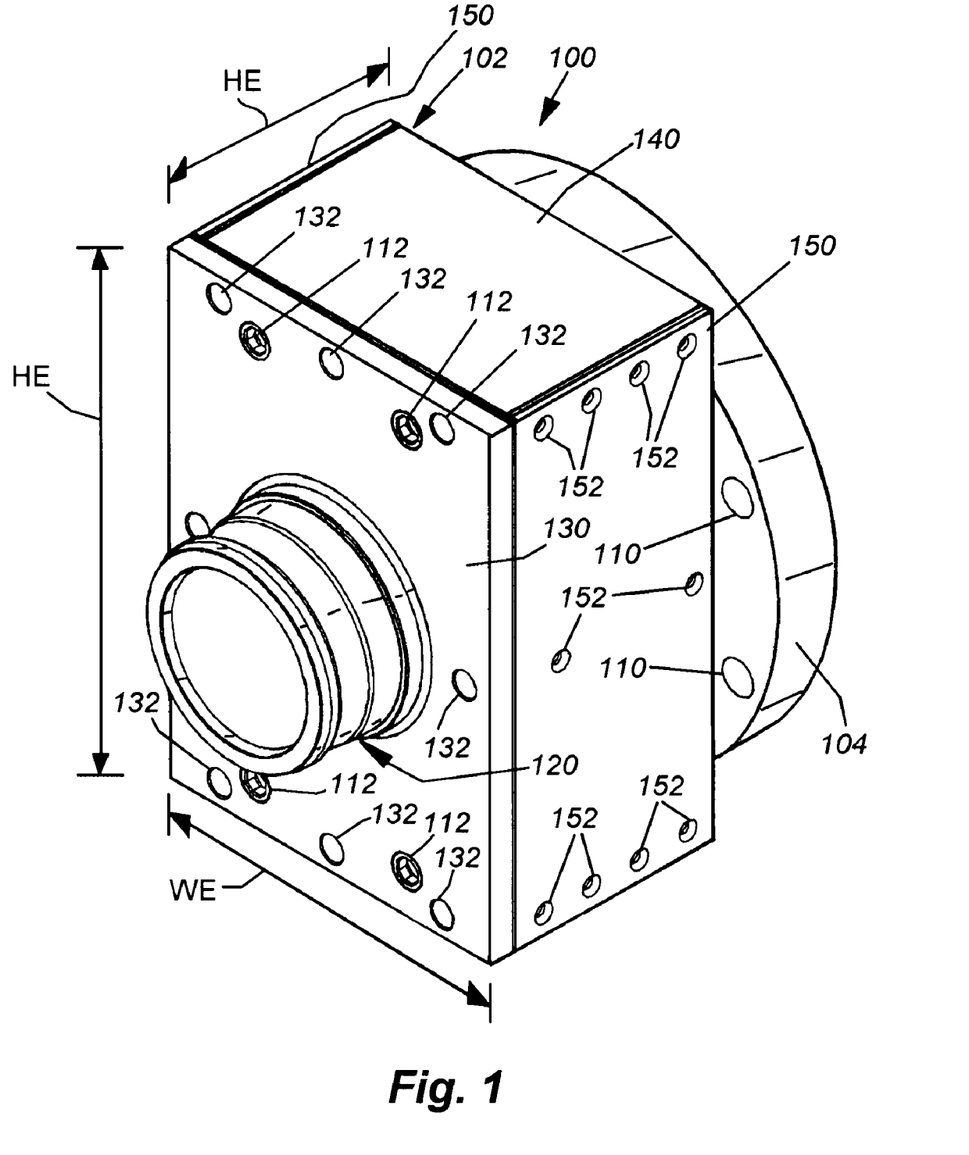
FIG. 1 is a perspective view of a heavy duty pinch valve according to an illustrative embodiment of this invention.

FIG. 1 details an external view of a heavy duty pinch valve 100 according to an illustrative embodiment of this invention. The valve housing 102 is completely enclosed, reducing the chance of foreign matter entering the structure's inner workings. As discussed above, this valve 100 is designed to attach to the bottom outlet of a bottom-emptying railroad tank car carrying, for example a slurry material, such as food-grade calcium carbonate. It can be applied to a variety of other storage and liquid-transport systems in alternate embodiments. By way of scale, the housing's generally rectangular outer dimensions define a width WE of approximately 10 inches, a length LE of approximately 14 inches, and a height HE of approximately 6 inches in this embodiment.

These measurements are widely variable according to alternate embodiments.

The base (the inlet side) of the valve 100 includes a circular flange 104 that is secured to the rectangular housing 102 by welding as described below. The flange includes a plurality of bolt holes 110 spaced about the perimeter of the flange 104. As described further below, the housing includes plug screws 112 that allow access through the housings interior so that bolt heads connecting the flange 104 to the tank can be accessed for attaching and removing the valve, without the need to disassemble the whole valve structure. The plug screws 112 also allow the housing to be drained in the event that liquid becomes trapped in the interior. When mounted on a tank bottom, the holes 364 (see FIG. 3) covered by the plug screws 112 are oriented downwardly, so upon removal of the screws, drainage is relatively complete. The plug-screw-holes are approximately ¾-1-inch in diameter in this embodiment. As also described below, most of the valve's components are constructed from a strong, durable metal, such as steel alloy (4140 in this example) or stainless steel. Stainless steel is used, in particular, where the contents of the storage tank are expected to contact the valve, such as the valve outlet 120. In other words, all metallic "wetted" surfaces of the valve are constructed from stainless steel in this example. The outlet 120 is welded to a bottom cover plate 130 that is, itself bolted (see bolt holes/bolts 132) to the underlying framework. The outlet has a shape that is adapted to allow an appropriate pipe fitting to be attached to it. The framework side plate 140 is shown in FIG. 1. Each of a pair of covering side plates 150 is also bolted to the framework (see bolt holes/bolts 152). While bolts are employed to secure plates together, thereby allowing easy maintenance of the valve, a variety of removable or permanent assembly techniques and mechanisms can be used in alternate embodiments.

Figure 2:
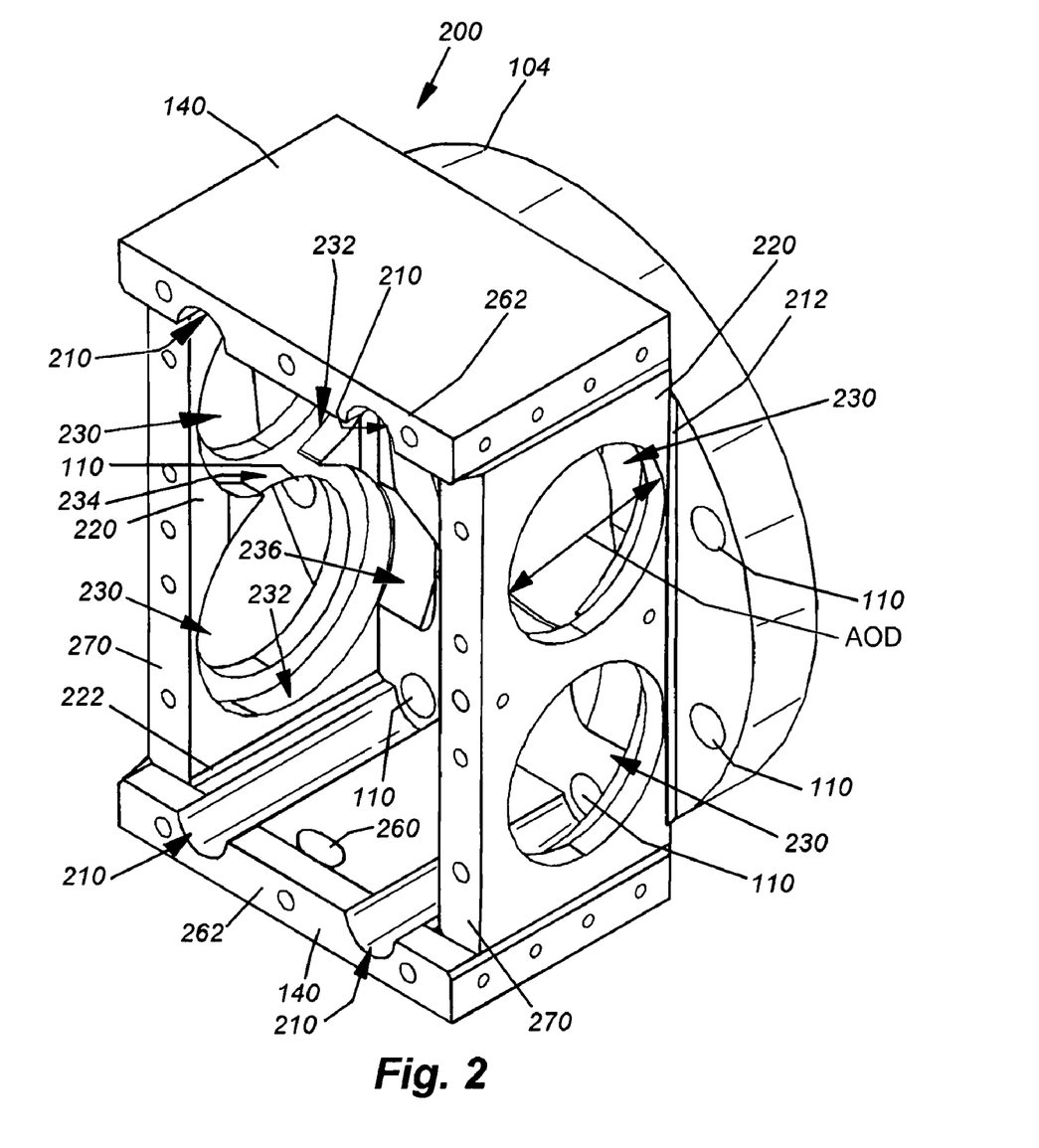
FIG. 2 is a perspective view of the framework of the valve of FIG. 1.

The framework 200 with attached flange is shown without covers or internal components in FIG. 2. The interior face of a framework side plate is exposed, detailing a pair of semi-cylindrical slots that are aligned with the interior bolt holes 110 of the flange as described above, the slots allow clearance for bolts and wrenches. The side plates 140 are attached to the flange via welding. Between the plates are opposing pinch element support plates 220 that are generally covered by the covering plates 150 shown in FIG. 1. The pinch element support plates 220 are welded (fillet 222) to the side plates 140 and also to the flange (see weld fillet 212). As described below, the flange includes slots for receiving an extension of each support plate 220 for added strength.

Each support plate includes a pair of apertures 230 having an exemplary outer diameter AOD of approximately 4.6-4.75 inches. This diameter is highly variable in alternate embodiments. The apertures 230 are sized and arranged to receive geared ends of a pair of pinch elements described below. Each aperture includes an enlarged-diameter inner shelf 232 that provides a race for the gear. The shelves are opened-up at a gear mating/meshing location between the apertures. The flange 104 includes an internal well 236 adjacent to each shelf 232 that allows for assembly of the pinch element (see below).

Each side plate 140 includes a milled slot 260 located below the bottom edge 262 of each side plate respectively. The slot is located in line with the bottom edge 270 of each support plate 220. This slot receives a key that supports an internal bottom plate as described below. Overall, the welded housing shown and described herein provides a very strong and durable one-piece structure. The various metal components of the housing can be constructed from plate metal having a thickness between approximately ½ and 1 inch, in the case of framework members, and ¼ and inch in the case of cover plates. Other thicknesses are expressly contemplated as appropriate for the application and scale of the valve. The flange 104 has a thickness of approximately 1 to 1½ inches in this embodiment. It should be clear that the exemplary one-piece framework contemplated by this invention is particularly suited to heavy duty pinch valve applications, where it is generally desirable that the mechanical components of the valve be rigidly supported and capable of performing for a great number of cycles.

Figure 3:
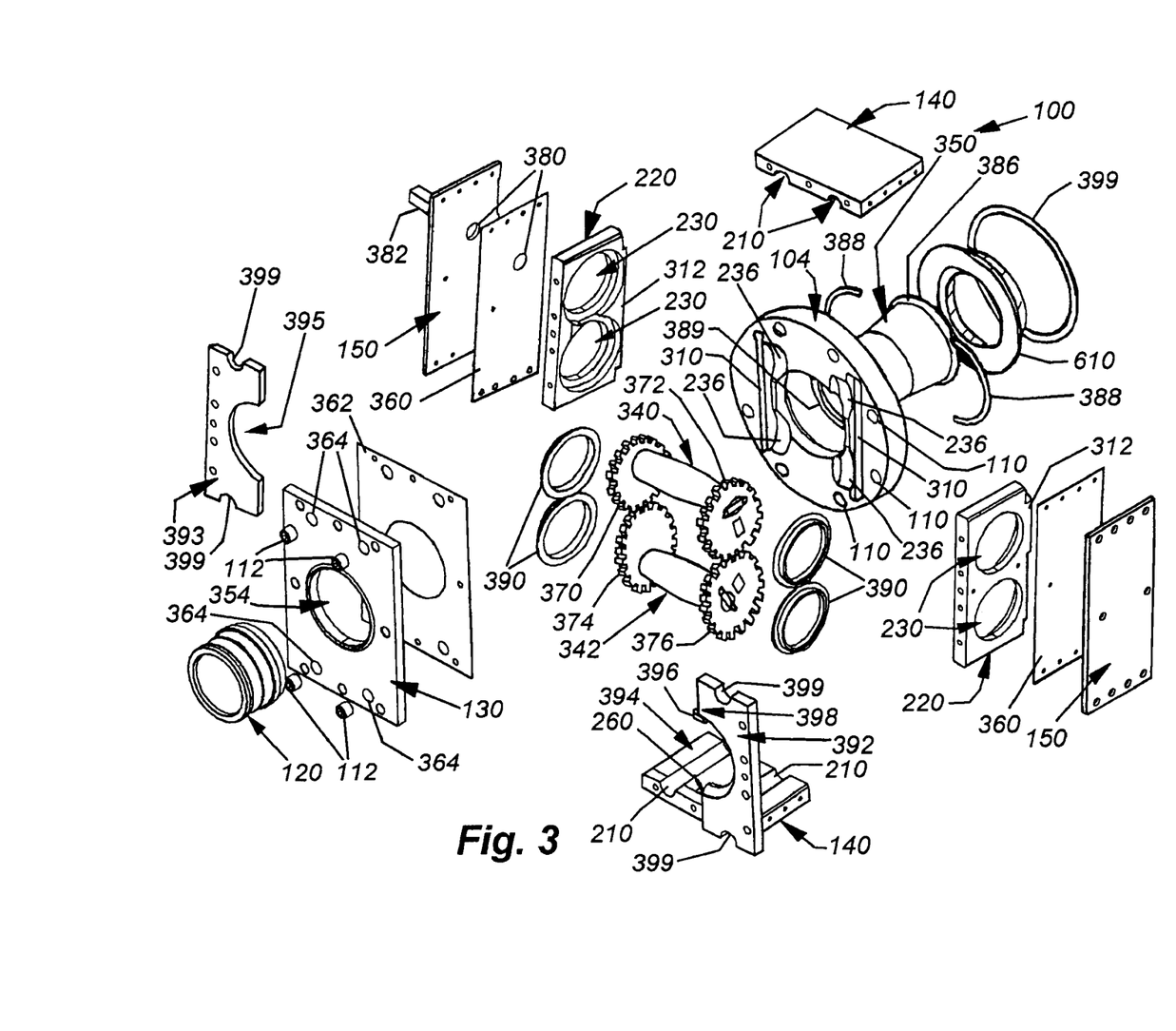
FIG. 3 is an exploded perspective view of the valve of FIG. 1 including internal components thereof.

FIG. 3 more completely details the valve 100 according to this embodiment in exploded view with all welded components separated from each other for a better overall view of the valve's structure. Notably, the slots 310 in the flange 104 are shown along with the extensions 312 of each pinch element support plate 220 that are designed to engage these slots before final welding. Conversely, in this embodiment, the top edges of the side plates 140 lay flat against the surface of the flange prior to fillet welding. The resulting framework, with four adjoining sides 140 and 220 attached together and to the flange creates a very sturdy framework into which the geared pinch elements 340 and 342 are rotatably mounted. These pinch elements are described further below. They are designed to variably impinge each of opposing sides of a spool 350 that is mounted in alignment with the central aperture 352 of the flange 104 and an opposing central aperture 354 of the bottom plate 130. The spool is constructed from food grade rubber in this example, having flexibility at temperatures as low as approximately −40° F.

To maintain an appropriate seal within the housing, the cover plates 150 and bottom plate 130 are sealed using gaskets 360 and 362, respectively. These gaskets can be constructed from any acceptable material, such as Teflon composite (in this example), or alternatively, synthetic rubber or polyurethane. The gaskets for a seal when the bolts holding the various cover plates are tightened to compress the plates against the underlying framework. Note in particular that the cover plates seal the gear apertures in the support plates 220 against infiltration of foreign matter, thus protecting the end gears 370, 372 and 374, 376 on the respective pinch elements 340 and 342 from possible seizure. Moreover, because the gears are enclosed within the framework, rather than exposed externally, the overall vertical height of the housing can be reduced, allowing the valve to suit applications with size limitations, such as the above-referenced railroad tank car. At least one cover plate (and gasket) is provided with a hole 380, through which a shaft 382 for actuating the pinch elements is disposed. The shaft is rotated between a fully opened and fully closed position by a bar, wrench, wheel or other appliance (not shown) that rides over the shaft. In the case of a tank car, a lock mechanism (also not shown) of conventional design maintains the bar in a closed position.

Note that the gears 370, 372, 374 and 376 each ride in a journal bearing 390 that resides in a respective aperture 230 of the support plates 220. The bearings 390 are axially restrained by a lip that conforms to the shelf (232 in FIG. 2) in each aperture 230. The bearings are constructed from a durable, long-lived material such as a fibrous composite approved for railroad use. Alternatively, the bearings can be constructed from another material, including a metal, such as bronze, or a polymer, such as Teflon, Delrin, and the like.

The flange-side of the spool is secured to the structure against axial movement by a sealing bead 386 that is molded into the spool end. The sealing bead 386 is removably restrained by a pair of semicircular rings 388. These rings 388 are split to allow assembly and subsequent replacement of the spool 350.

The bottom plate 130 rests on a pair of closure plates 392 and 393 that each define half of the spool aperture (semi-circular holes 394 and 395). These plates are also split so that the spool 350 can be removably supported along the opposing spool sealing bead 389 described further below. As discussed above, a slot 260 formed on the inner wall of each side plate 140 receives a removable key 396 that supports an inner corner 398 of each closure plate 392. The closure plates each include holes aligned with the bolt holes on the bottom plate 130. The holes are sized to allow bolt shafts to pass through where they engage threads on the edges of the support plates 220. In this manner the closure plate 392 is essentially sandwiched in compression between the support plates 220 and the bottom plate 130. Note that each closure plate includes half-round notches 399 aligned with the slots 210 in the side plate 140.

Figure 4:
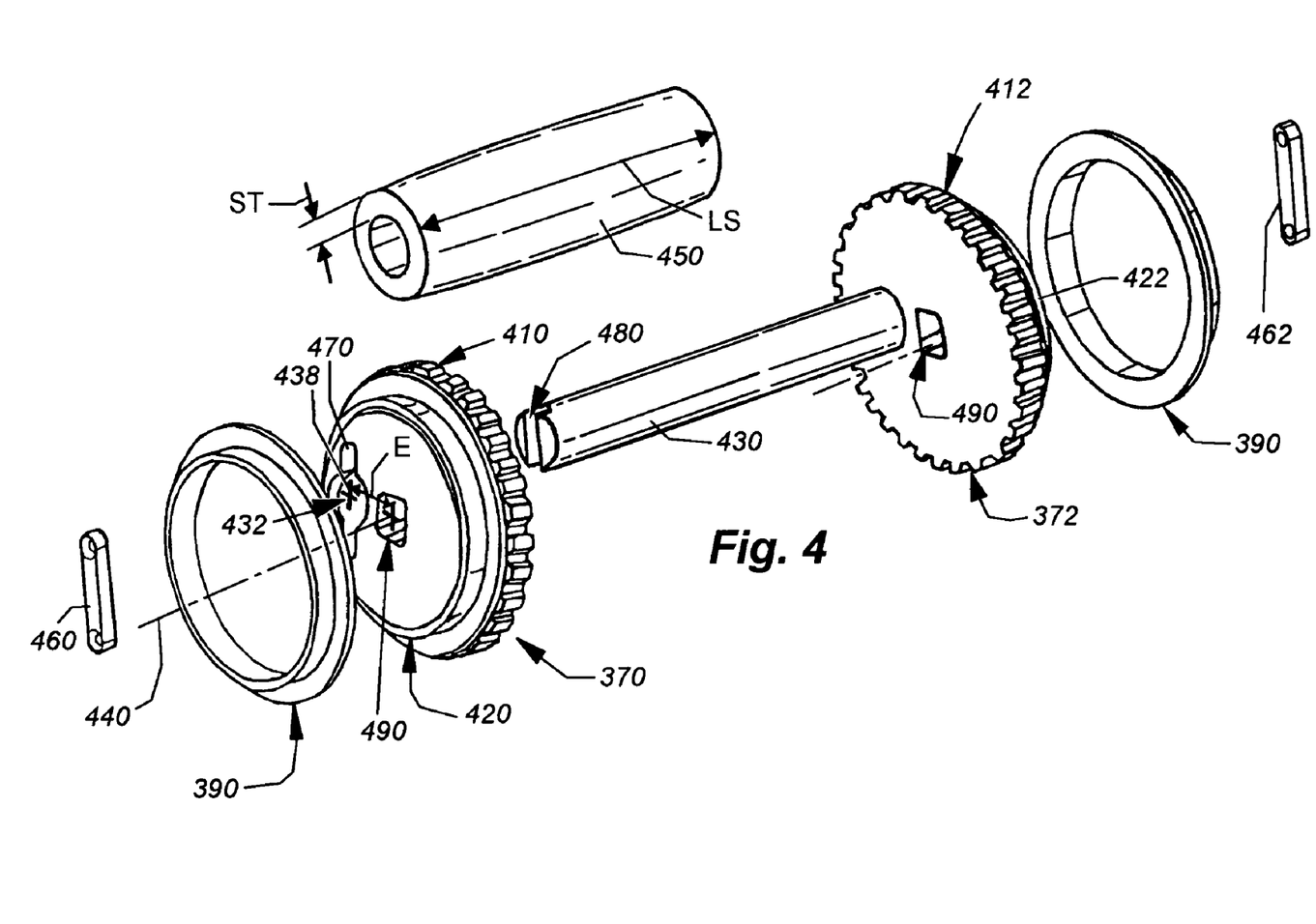
FIG. 4 is a more detailed exploded perspective view of one of the pair of pinch elements for the valve of FIG. 1.
Figure 5:
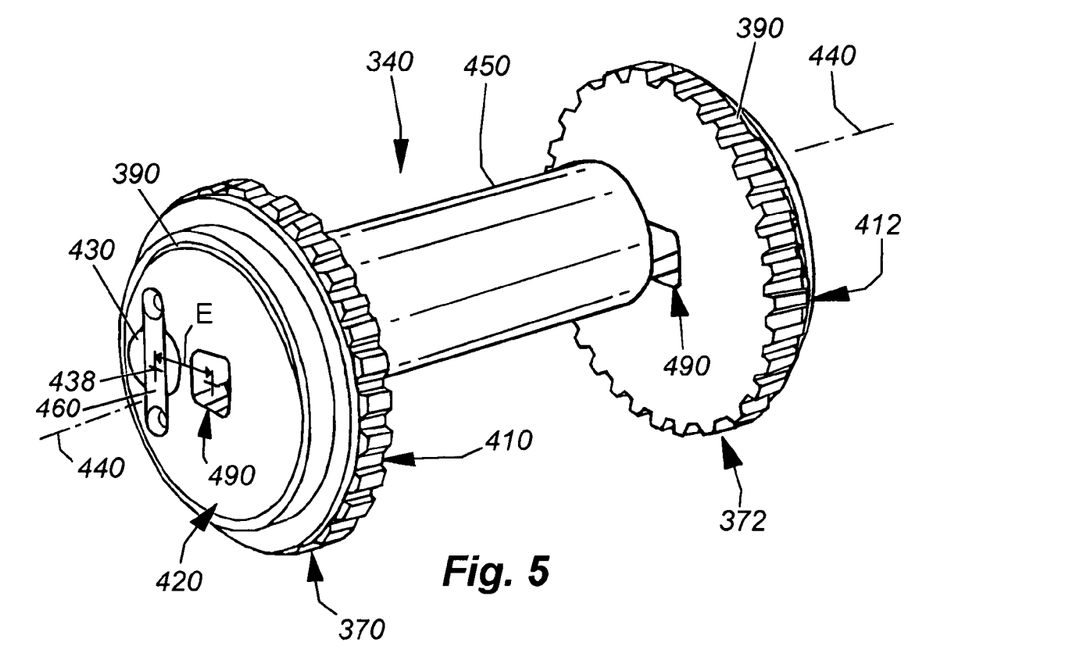
FIG. 5 is a more detailed perspective view of the pinch element of FIG. 4 in assembled form.

Reference is now made to FIGS. 4 and 5, which show more detailed views of the pinch elements 340 and 342. For the purposes of this description, one pinch element 340 is featured. However, the structure of the opposing pinch element is essentially the same. At each end of the pinch element 340 resides a gear 370, 372. Each gear is constructed from a hard material such as 4041 alloy steel. Each gear 370, 372 consists of a tooth section 410, 412, respectively, that can have any acceptable pitch and tooth design. In this example, the gears of both pinch elements are the same diameter and have equal pitch, thus causing them to move at the same rate.

Each gear 370, 372 also defines a bearing section 420, 422, respectively, outboard of the gear section, 410, 412. The bearing section 420, 422 is smaller in diameter than the gear section, by approximately 1.1 inches in this example. The bearing section is designed to rotate on a bearing sleeve 390 that resides in each respective support plate aperture 230. The bearing 390 has an L-shaped cross section so that it provides a smooth bearing surface against each gear in both the rotational and axial (along axis 440) degrees of freedom.

The gears 370, 372 support an eccentrically mounted shaft 430. The shaft is constructed from stainless or alloy steel. It is approximately 1 inch in diameter and approximately 8 inches long. It resides in an eccentric hole 432 formed through each gear 340, 342. The eccentricity E of the hole's center 438 with respect to the axis of rotation 440 is approximately 1.1 inches. The shaft 430 is covered by a freely rotating sleeve 450 having a length LS of approximately 5.95 inches and a wall thickness ST of approximately 0.25 inches, thereby defining an overall shaft diameter of approximately 1.5 inches. The sleeve is constructed from aluminum alloy or stainless steel in this embodiment and includes a low-friction outer coating, such as Teflon. As discussed further below, the rotation of the sleeve 450 aids in avoiding unwanted springback due to the binding of the pinch element on the spool as it rotates to close on the spool. To this end, the sleeves 450 are located on the gears 340, 342, and the gears 370, 372 374, 376 are sized, so that the pinch sleeves are located approximately 0.8 inches apart at their closest points of rotation.

As shown in FIGS. 4 and 5, the shaft 430 is designed for easy removal through the gear holes 438. When one of the side cover plates 150 is removed, the shaft 430 can be passed out of the housing for disassembly of the pinch element, and replacement of the sleeve or another component. The shaft 430 is axially and rotationally restrained with respect to each gear by a key 460 and 462 that is bolted into a conforming slot (see slot 470) respectively, on each outboard gear face. The key engages a key slot (see key slot 480) formed each opposing end of the shaft 430. By simply unbolting and removing a key, the shaft 430 can be passed through the gear, and out of the housing. The sleeve 450 can then be removed and the gears can be backed inwardly away from their apertures for complete disassembly and removal of the pinch element.

Figure 6:
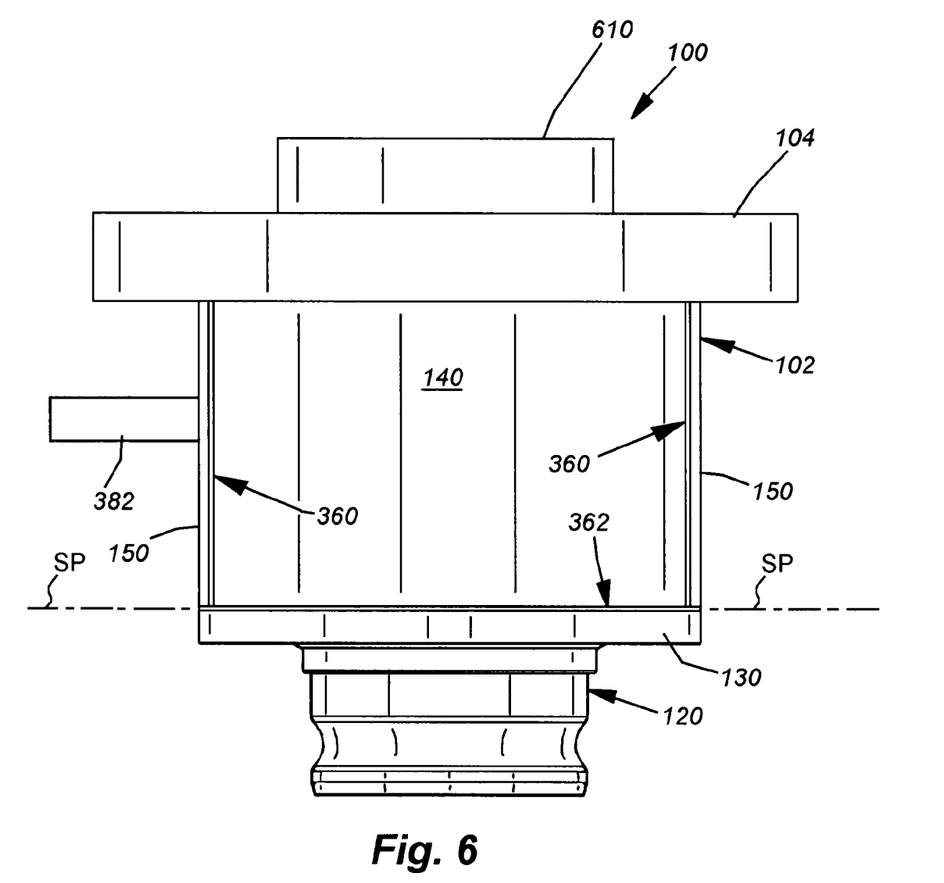
FIG. 6 is a side view of the valve of FIG. 1 showing the handle shaft for actuating the valve.

As shown each gear 370, 372, 374 and 376 includes a central drive hole 490 that is square in this embodiment. This drive hole 490 receives a square-cross-section drive shaft 382 that extends through a hole in the side cover plate 150 as discussed above. The location of the shaft is shown in further detail in FIG. 6. Since the pinch elements are geared together on each end, the shaft 382 can be located on either side, and can be positioned with respect to either pinch element allowing for maximum versatility in valve-handle placement. Referring further to FIG. 6, the bottom cover plate 130 and welded outlet fixture 120 are located on a shear plane SP in which these components may break free of the housing 102 without causing failure of the housing itself or release of the pinch elements. Thus, in the event of a derailment (in a railcar application of the valve), the outlet 120 and bottom cover plate 130 will break free through shearing of the bottom cover plate bolts (132 in FIG. 1) leaving the heavy valve housing unscathed and still retaining the tank's contents. FIG. 6 also details the inlet fixture 610 that is bolted onto the flange 104 to retain the upper end of the spool. The internal construction of this component and the overall workings of the valve 100 are shown in the cross-sectional views of FIGS. 7 and 8.

Figure 7:
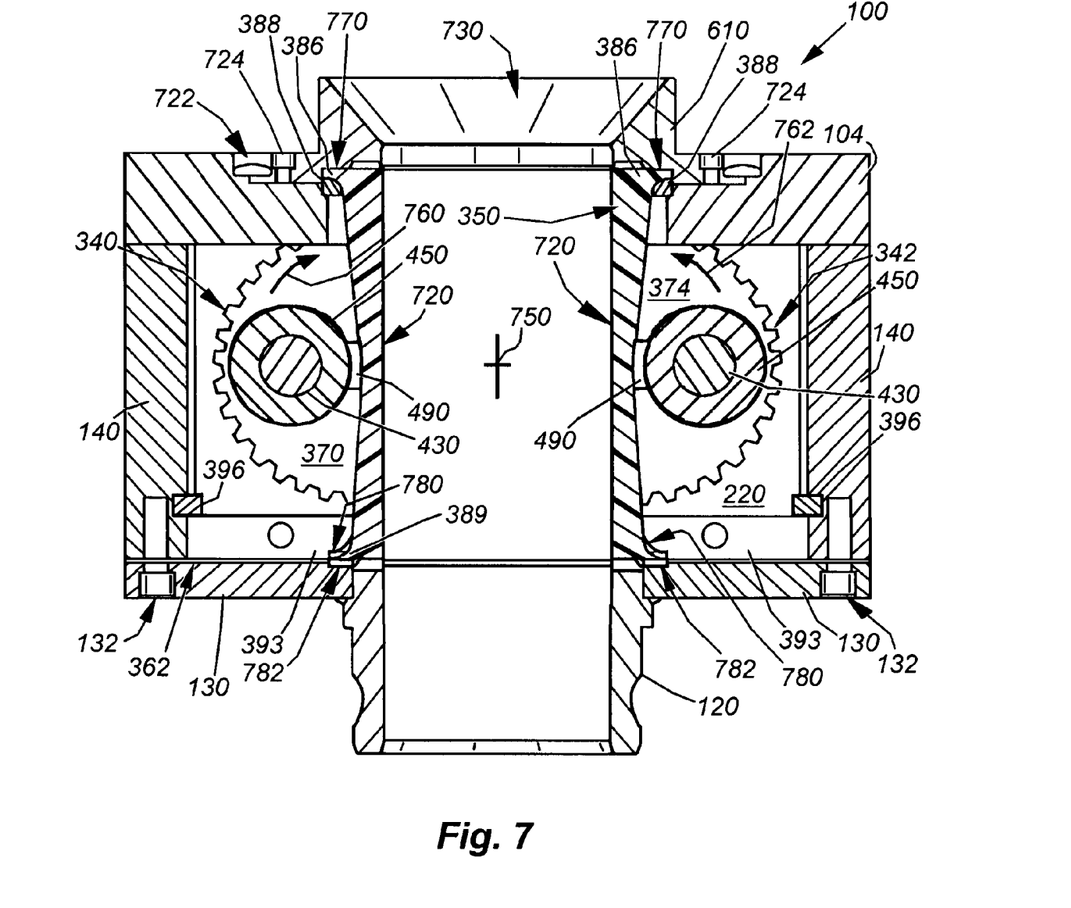
FIG. 7 is a side cross section of the valve of FIG. 1 showing the pinch elements located in a fully opened position.

In FIG. 7, the valve is shown in a fully opened condition with the spool 350 out of contact with the sleeves 450 of the pinch elements 340 and 342. Note that the spool 350 in this example includes a convoluted (narrowed) central region 720 to facilitate pinching. Of particular note in the view of FIG. 7 is the attachment of the inlet fixture 610 to a recess 722 in the flange 104. The inlet fixture 610 defines an AAR-standard geometry and a frustoconical inlet 730. It is secured to the flange 104 by bolts 724. An elastomeric ring gasket 399 (FIG. 3) can be disposed between the fixture 610 and a tank car outlet (not shown).

Also notable in FIG. 7 is the interaction between the inlet sealing bead 386 and the split ring 388 having a conforming shape. The fixture 610 applies compression between the ring 388 (which acts as a shelf for the bead 386) and the inner surface 770 of the inlet fixture 610. Since the inlet fixture is composed of stainless steel, this compression seal ensures that only the spool or the stainless fixture come into contact with the tank contents.

Likewise, at the outlet, the closure plates 393 (and 392 shown above) define a conforming surface 780 that provides a shelf for the bottom/outlet sealing bead 389. The bottom cover plate compresses the bead at inner surfaces 782 and forms a seal between the stainless outlet 120 and the spool. Compression occurs as the bolts 132 are tightened into the side plates 140. To ensure that the tank contents does not contact any regular steel of the housing the bottom cover plate 130 can also be constructed from stainless steel in an illustrative embodiment.

According to FIG. 7, the pinch element shafts 430 and sleeves are separated at their maximum distance. As discussed above, the gears mesh at the point 750 on each side of the valve housing. When the shaft (382 in FIGS. 3 and 6) is rotated, the meshing gears on both ends of each pinch element counter-rotates (arrows 760 and 762) to bring the sleeves 450 simultaneously into contact with the spool 350. The counter-rotation causes each sleeve to contact the same axial point on each side of the spool as the pinch elements rotate. This equal and opposite pinching provides a mechanically equalized closure that (along with the rotating sleeves 450) significantly reduces required effort in closing the valve. This counter-rotating pinch element closure also ensures that the spool will expand, opening the valve upon release of the elements, even in the presence of well-frozen contents. The overall pinching effect thereby reduces the area of the spool in pro-portion to rotation from the fully opened to fully closed condition.

Figure 8:
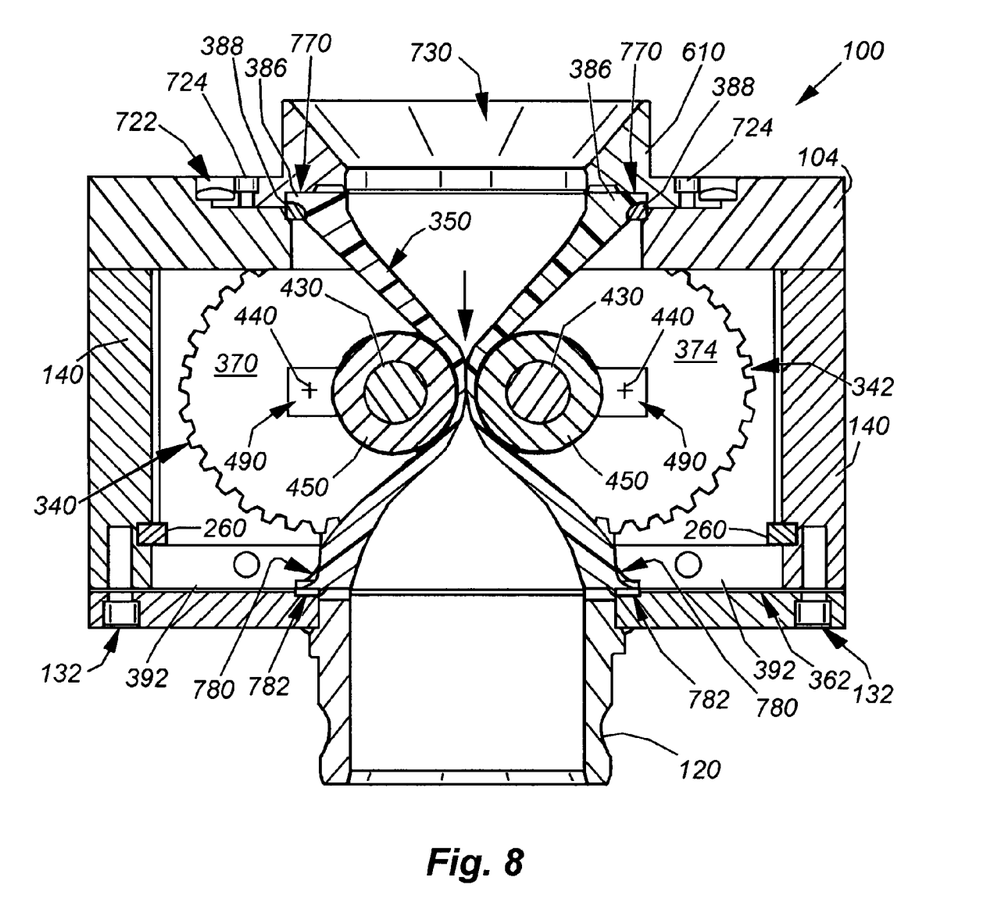
FIG. 8 is a side cross section of the valve of FIG. 1 showing the pinch elements located in a fully closed position.

Referring to FIG. 8, the sleeves have moved 180 degrees (relative to the fully opened condition of FIG. 7) and are now at their closest proximity. As shown, the spool 350 has been pinched to complete sealing closure. The thickness of the spool wall in the central region 720 is chosen so that the pinch elements apply slight compression and plastic deformation to the wall material to ensure sealing. The pinched material expands laterally in a direction perpendicular to the view. The housing is provided with sufficient room to accommodate the lateral expansion of the spool as it is pinched closed.

It should be clear for the above description that the heavy duty pinch valve of this invention is effective in discharging contents, even when frozen. In tests of an early prototype, frozen calcium carbonate slurry exited the spool without significant resistance after being allowed to freeze for more than 24 hours in temperatures ranging from −5 to −40° F. This effectiveness is in part from the non-binding nature of the pinch valve geometry and the fact that the spool elastically returns to an opened position whenever the pinch force is removed.

The foregoing has been a detailed description of an illustrative embodiment of this invention. Various modifications and additions can be made without departing from the spirit and scope thereof. For example, the scale of the valve can be varied for differing applications from that shown and described herein. Similarly, the placement of covers and internal frame components can be varied within the general spirit of this invention. Also, additional reinforcing structures and/or differing inlet/outlet fixtures can be employed for different applications. Moreover, while a one-piece welded framework is described herein, as it allows for ease of construction using inboard gearing (i.e. inside walls can be machined prior to assembly), it is contemplated that a cast or milled frame-work can be provided in alternate embodiments, such as when gears are located externally of the framework. Accordingly, this description is meant to betaken only by way of example and not to otherwise limit the scope of this invention.

What is claimed is:

1. A heavy duty pinch valve for a tank car comprising:
   a one-piece welded framework comprising a flange adapted to be secured to the tank car, having welded thereto a pair of support plates, each having a pair of apertures rotatably retaining each of a first pinch element and a second pinch element respectively that are geared together to each rotate into contact with, and to plastically deform, a spool mounted in the framework, and side plates having edges that are welded to adjacent edges of the support plates;
   a pair of cover plates that sealably cover each of the support plates; and
   an outlet cover plate sealably secured by fasteners to edges of the support plates and edges of the side plates opposite edges of the side plates and edges of the support plates adjacent the flange.

2. The heavy duty pinch valve of claim 1 wherein each of the first pinch element and the second pinch element respectively includes a bearing shaft disposed between opposing gears mounted in the apertures and a rotatable sleeve located over each bearing shaft, each sleeve variably engaging the spool to pinch the spool.

3. The heavy duty pinch valve of claim 2 wherein the gears of the first pinch element mesh with the gears of the second pinch element so that rotation of the first element causes counter-rotation of the second pinch element.

4. The heavy duty pinch valve of claim 1 wherein the spool is retained in the framework by an inlet sealing bead and an outlet sealing bead that respectively engage split inlet support structure and split outlet support structure, each of the split inlet support structure and the split outlet support structure being retained in compression against the respective inlet sealing bead and the outlet sealing bead by a respective inlet fixture and outlet fixture.

5. The heavy duty pinch valve as set forth in claim 4 wherein the inlet fixture is constructed and arranged to engage an outlet of a bottom-emptying railroad tank car.

6. The heavy duty pinch valve as set forth in claim 5 wherein the outlet fixture comprises a shear plate that is secured by bolts to the framework.

7. The heavy duty pinch valve as set forth in claim 6 wherein the split outlet support structure comprises a pair of closure plates that reside in the framework and rest on a pair of shelf keys attached to the framework.

8. The heavy duty pinch valve as set forth in claim 1 wherein the outlet cover plate defines a shear plane attached to the framework by fasteners adapted to shear in response to a predetermined impact.

9. The heavy duty pinch valve as set forth in claim 1 wherein the framework is mounted to a flange having a plurality of bolt holes, at least some of the bolt holes residing within an interior of the framework and further comprising a bottom cover plate that include sealable access structures through which the bolt holes within the interior can be accessed.

10. The heavy duty pinch valve as set forth in claim 9 wherein the framework includes channels aligned with the bolt holes that allow clearance for tools and bolts to pass along the framework.

11. The heavy duty pinch valve as set forth in claim 1 wherein each of the first pinch element and the second pinch element respectively includes a bearing shaft disposed between opposing gears mounted in the supports and each shaft is axially retained in an eccentrically located shaft hole in at least one of the gears by a removable key that allows the shaft to be removed through the shaft hole in the gear and out of the housing upon removal of the key.

12. The heavy duty pinch valve of claim 11 further comprising a rotatable sleeve located over each bearing shaft, each sleeve variably engaging the spool to pinch the spool, each sleeve being removable from each shaft when the shaft is passed through the shaft hole.

13. The heavy duty pinch valve as set forth in claim 11 wherein each of the first pinch element and second pinch element includes a sleeve that contacts and deforms the spool when the pinch valve is in a fully closed condition such that the sleeve of the first pinch element and the sleeve of the second pinch element are at their closest proximity when the pinch valve is in its fully closed condition.

14. The heavy duty pinch valve as set forth in claim 13 wherein each sleeve is out of contact with the spool when the pinch valve is in a fully opened condition such that the first and second pinch element shafts and sleeves are separated at their maximum distance.

15. The heavy duty pinch valve as set forth in claim 11 wherein the spool includes a convoluted central region to facilitate pinching of the pinch valve.

\* \* \* \* \*